(12) United States Patent
Wen et al.

(10) Patent No.: US 10,177,862 B2
(45) Date of Patent: Jan. 8, 2019

(54) SYSTEM AND METHOD FOR PERFORMING OVER-THE-AIR TESTS FOR MASSIVE MULTI-INPUT/MULTI-OUTPUT WIRELESS SYSTEM

(71) Applicant: Keysight Technologies, Inc., Minneapolis, MN (US)

(72) Inventors: Zhu Wen, Beijing (CN); Ya Jing, Beijing (CN); Shao-Bo Chen, Fuzhou (CN); Hong-Wei Kong, Beijing (CN)

(73) Assignee: Keysight Technologies, Inc., Santa Rosa, CA (US)

( * ) Notice: Subject to any disclaimer, the term of this patent is extended or adjusted under 35 U.S.C. 154(b) by 0 days.

(21) Appl. No.: 15/615,442

(22) Filed: Jun. 6, 2017

(65) Prior Publication Data
US 2018/0337738 A1    Nov. 22, 2018

(30) Foreign Application Priority Data

May 22, 2017 (CN) .......................... 2017 1 0362767

(51) Int. Cl.
| | | |
|---|---|---|
| H04B 17/00 | (2015.01) | |
| H04B 17/29 | (2015.01) | |
| H04B 17/391 | (2015.01) | |
| H04B 7/04 | (2017.01) | |
| H04B 17/12 | (2015.01) | |

(52) U.S. Cl.
CPC .......... *H04B 17/0082* (2013.01); *H04B 7/04* (2013.01); *H04B 17/0085* (2013.01); *H04B 17/12* (2015.01); *H04B 17/29* (2015.01); *H04B 17/391* (2015.01)

(58) Field of Classification Search
None
See application file for complete search history.

(56) References Cited

U.S. PATENT DOCUMENTS

| | | |
|---|---|---|
| 7,755,550 B2 | 7/2010 | Hess et al. |
| 8,471,774 B2 | 6/2013 | Oh et al. |
| 9,121,874 B2 | 9/2015 | Oh et al. |
| 9,439,086 B2 | 9/2016 | Emmanuel et al. |

(Continued)

OTHER PUBLICATIONS

Kraus, et al., "Antennas—For All Applications", Third Edition, The McGraw-Hill Companies, Inc., Publishing House of Electronics Industry, Beijing, 2003, p. 831.

(Continued)

*Primary Examiner* — Alejandro Rivero

(57) ABSTRACT

A test system for testing a device under test includes: a signal processor configured to generate a plurality of independent signals and to apply first fading channel characteristics to each of the independent signals to generate a plurality of first faded test signals; a test system interface configured to provide the plurality of first faded test signals to one or more signal input interfaces of the device under test (DUT); a second signal processor configured to apply second fading channel characteristics to a plurality of output signals of the DUT to generate a plurality of second faded test signals, wherein the second fading channel characteristics are derived from the first fading channel characteristics; and one or more test instruments configured to measure at least one performance characteristic of the DUT from the plurality of second faded test signals.

20 Claims, 8 Drawing Sheets

(56) References Cited

U.S. PATENT DOCUMENTS

| | | | |
|---|---|---|---|
| 2011/0084887 A1* | 4/2011 | Mow | G01R 29/10 343/703 |
| 2014/0098846 A1* | 4/2014 | Emmanuel | H04W 24/06 375/224 |
| 2016/0212641 A1 | 7/2016 | Kong et al. | |
| 2016/0337052 A1 | 11/2016 | Wen et al. | |

OTHER PUBLICATIONS

"Radiated Power and Phase Calibration of a Multichannel Signal Transmitter," ip.com disclosure No. IPCOM000249094D, published on Feb. 3, 2017, 10 pages.

"Near and far field", In Wikipedia—the free encyclopedia [online], 12 pages. [retrieved on Jun. 6, 2017] Retrieved from the Internet: <URL: https://en.wikipedia.org/wiki/near_and_far_field>.

* cited by examiner

SYSTEM AND METHOD FOR PERFORMING OVER-THE-AIR TESTS FOR MASSIVE MULTI-INPUT/MULTI-OUTPUT WIRELESS SYSTEM

CROSS REFERENCE TO RELATED APPLICATIONS

The present application claims priority under 35 U.S.C. § 119(e) from Chinese Patent Application No. 201710362767.2 filed on May 22, 2017 naming Zhu Wen, et al. as inventors. The entire disclosure of Chinese Patent Application No. 201710362767.2 is specifically incorporated herein by reference.

BACKGROUND

Communication demands, and particularly wireless communication demands, continue to increase. Next generation wireless communication systems, commonly referred to as "5G communication systems" are being developed, to meet these demands. One important technology to be adopted by 5G communication systems involves the use of base stations which have a large number of input and outputs (sometimes referred to as a massive multi-input, multi-output (MIMO) wireless communication system) to serve a large number of communication users. Massive MIMO uses a large number of antennas or antenna elements and time division duplex operation to serve multiple active user terminals at the same time. Extra antennas focus energy into ever-smaller regions of space to bring huge improvements in throughput and radiated energy efficiency. Massive MIMO wireless communication systems may have hundreds of transmit (Tx) and receive (Rx) channels and corresponding radio frequency (RF) antennas.

In general, massive MIMO wireless communication systems and terminals, like other electronics, require testing and, in some cases, calibration. However, testing and calibration can present challenges in the case of a multi-user massive MIMO wireless communication system or terminal which includes a large number of input and outputs and antennas.

For example, an over-the-air (OTA) test is important and necessary to evaluate RF performance and antenna performance. In traditional OTA test solutions, testing or measuring different OTA measurement metrics require different OTA test systems with different radiation fields, including reactive near field, radiative near field, and far field. In general, any single existing OTA test method and system by itself cannot address all the requirements for obtaining the various kinds of OTA measurement metrics which are typically required for a massive MIMO wireless system. On the other hand, using multiple different OTA test systems will increase the cost of the testing. Also, in many OTA test scenarios, such as OTA testing in manufacturing, the OTA test approach needs to be fast (due to the large number of DUTs to be tested) and cost effective, and traditional OTA test approaches are not suitable due to either the test speed being inadequate or the cost being too great.

So, better solutions for testing multi-user massive MIMO wireless communication system or terminal performance are needed, particularly for performing OTA tests of MIMO systems in the manufacturing setting.

Thus it would be desirable to provide an improved method and system to test and calibrate the performance of a multi-input/multi-output communication system or device. In particular, it would be desirable to provide an improved system and method for performing OTA tests for multi-user massive MIMO wireless communication systems and terminals in a manufacturing setting.

SUMMARY

In one aspect, a method is provided for testing a multi-input, multi-output (MIMO) device under test (DUT) having an array of MIMO antenna elements. The method comprises: measuring at least one calibration parameter for the array of MIMO antenna elements of the MIMO DUT using a plurality of probe antennas which are disposed within an over-the-air (OTA) test chamber and which are located in a near field region of the MIMO antenna elements; measuring at least one radio frequency (RF) channel parameter for each of a plurality of RF channels of the MIMO DUT using the plurality of probe antennas which are disposed within the OTA test chamber and which are located in the near field region of the MIMO antenna elements; measuring a first intensity of a near field radiation pattern produced by the MIMO antenna elements within the OTA test chamber at a point along a central axis orthogonal to the array of the MIMO antenna elements; measuring additional intensities of the near field radiation pattern produced by the MIMO antenna elements within the OTA test chamber at a plurality of other points disposed along a first circle defining an expected beamwidth of a main lobe of a far field radiation pattern of the MIMO antenna elements; and applying a mapping relationship to the measured near field intensities of the near field radiation pattern to ascertain a beam gain, and a beam width of the main lobe, of the far field radiation pattern for the MIMO antenna elements.

In some embodiments, the plurality of probe antennas are mounted on a telescopic boom associated with the test chamber and are located at fixed positions while measuring the at least one calibration parameter for the array of MIMO antenna elements.

In some embodiments, the at least one calibration parameter includes at least one of: an amplitude, a phase, a delay, and a frequency response of at least one of the plurality of RF channels of the MIMO DUT.

In some embodiments, measuring the at least one calibration parameter for each of the plurality of RF channels of the MIMO DUT includes applying different delay shifts to different ones of the RF channels of the MIMO DUT.

In some embodiments, measuring the at least one calibration parameter for each of the plurality of RF channels of the MIMO DUT includes applying different phase patterns to different ones of the RF channels of the MIMO DUT.

In some embodiments, measuring the at least one calibration parameter includes applying a time difference of arrival (TDOA) algorithm to signals received at the probe antennas from the array of MIMO antenna elements to ascertain distances between each probe antenna and each MIMO antenna element.

In some embodiments, the array of MIMO antenna elements is a uniform planar array (UPA) having a uniform distance D between each pair of adjacent MIMO antenna elements, and wherein the probe antennas are uniformly spaced with a distance of N*D between each pair of adjacent probe antennas, where N is an integer. The method includes: measuring phases of each RF channel of each MIMO antenna element at each probe antenna; and ascertaining distances between each probe antenna and each MIMO antenna element from the measured phases of each RF channel of each MIMO antenna element at each probe antenna, and the integer N.

In some embodiments, the method further includes further comprising measuring the at least one RF channel parameter for each of the plurality of RF channels of the MIMO DUT at a same time as each other.

In some embodiments, measuring the at least one RF channel parameter for each of the plurality of RF channels of the MIMO DUT using the plurality of probe antennas includes: measuring a transmission matrix of a wireless transmission channel between the MIMO DUT and the probe antennas; and applying an inverse of the transmission matrix to signals received by the probe antennas to recover the signals transmitted from the MIMO DUT.

In some embodiments, the at least one RF channel parameter includes at least one of an error vector magnitude, an adjacent channel leakage ratio, a spectrum emission mask, an adjacent channel selectivity, an in-channel receiver sensitivity, a dynamic range, and a blocking.

In some embodiments, the method further comprises: for each of a plurality of other known-good devices and known-bad devices each having a corresponding array of device antenna elements, wherein the known-good devices are known to meet their performance specifications and the known-bad devices are known to not meet their performance specifications: measuring a first far field intensity of the far field radiation pattern at a second point along the central axis orthogonal to the array of device antenna elements, and measuring additional far field intensities of the far field radiation pattern at a plurality of additional points disposed along a second circle defining the expected beamwidth of the main lobe of the far field radiation pattern of the device antenna elements; placing each of the other known-good and known-bad devices in the OTA test chamber; for each of the other known-good and known-bad devices, one at a time: measuring the first near field intensity of the near field radiation pattern produced by the device antenna elements within the OTA test chamber at the first point along the central axis orthogonal to the array of device antenna elements, and measuring the additional first near field intensities of the near field radiation pattern produced by the device antenna elements within the OTA test chamber at the plurality of other points disposed along the first circle defining the expected beamwidth of the main lobe of the far field radiation pattern of the device antenna elements; and applying the measured near field intensities of the near field radiation patterns of the other known-good and known-bad devices to an input of a neural network, and using the measured far field intensities of the far field radiation patterns of the other known-good and known-bad devices as training output to train the neural network to construct the mapping relationship.

In another aspect, a system is provided for testing a multi-input, multi-output (MIMO) device under test (DUT) having an array of MIMO antenna elements. The system comprises: an over-the-air (OTA) test chamber having a plurality of probe antennas disposed therein, the OTA test chamber being configured to receive the MIMO DUT therein during a test of the MIMO DUT such that the probe antennas are located in a near field region of the array of MIMO antenna elements; a connection device configured to connect the probe antennas to at least one test instrument; and a controller configured to control the system to test the MIMO DUT by: controlling the at least one test instrument to measure at least one calibration parameter for the array of MIMO antenna elements of the MIMO DUT using the plurality of probe antennas; measuring at least one radio frequency (RF) channel parameter for each of a plurality of RF channels of the MIMO DUT using the plurality of probe antennas disposed within the OTA test chamber and located in the near field region of the MIMO antenna elements; measuring a first near field intensity of a near field radiation pattern produced by the MIMO antenna elements within the OTA test chamber at a point along a central axis orthogonal to the array of the MIMO antenna elements, measuring additional near field intensities of the near field radiation pattern produced by the MIMO antenna elements within the OTA test chamber at a plurality of other points disposed along a circle defining an expected beamwidth of a main lobe of a far field radiation pattern of the MIMO antenna elements, and applying a mapping relationship to the measured near field intensities of the near field radiation pattern to ascertain a beam gain, and a beam width of the main lobe, of the far field radiation pattern for the MIMO antenna elements.

In some embodiments, an interior width of the OTA test chamber is less than one meter greater than a width of the MIMO DUT, an interior height of the OTA test chamber is less than one meter greater than a height of the MIMO DUT, and an interior depth of the OTA test chamber is less than one meter greater than a length of the MIMO DUT.

In some embodiments, the at least one test instrument comprises one or more test instruments having a plurality of test channels, and wherein the connection device comprises a plurality of parallel connections from the probe antennas to the one or more test instruments.

In some embodiments, the connection device comprises at least one switch connected to each of the probe antennas and configured to sequentially connect the probe antennas to the at least one test instrument under control of the controller.

In some embodiments, the test instrument includes at least one of a signal source and a spectrum analyzer.

In yet another aspect, a method is provided for testing a multi-input, multi-output (MIMO) device under test (DUT) having an array of antenna elements. The method comprises: connecting via a connection device at least one test instrument to a plurality of probe antennas which are disposed within an over-the-air (OTA) test chamber; placing the MIMO DUT within the OTA test chamber such that the probe antennas are located in a near field region of the antenna elements; measuring at least one calibration parameter for the array of antenna elements of the MIMO DUT using the plurality of probe antennas located in the near field region of the antenna elements and the at least one test instrument; measuring at least one radio frequency (RF) channel parameter for each of a plurality of RF channels of the MIMO DUT using the plurality of probe antennas disposed within the OTA test chamber and located in the near field region of the antenna elements and the at least one test instrument; measuring a first near field intensity of a near field radiation pattern produced by the antenna elements within the OTA test chamber at a point along a central axis orthogonal to the array of the antenna elements; measuring near field intensities of the near field radiation pattern produced by the antenna elements within the OTA test chamber at a plurality of other points disposed along a first circle defining an expected beamwidth of a main lobe of a far field radiation pattern of the antenna elements using the at least one test instrument; and applying a mapping relationship to the measured near field intensities of the near field radiation pattern to ascertain a beam gain, and a beam width of the main lobe, of the far field radiation pattern for the antenna elements.

In some embodiments, the at least one test instrument comprises one or more test instruments having a plurality of test channels corresponding to a number of the probe antennas of the OTA test chamber, and wherein the connection device comprises a plurality of parallel connections each corresponding to one of the probe antennas.

In some embodiments, the at least one test instrument comprises one or more test instruments having a plurality of test channels, and wherein the connection device comprises a plurality of parallel connections from the probe antennas to the one or more test instruments, and wherein measuring the at least one RF channel parameter for each of the plurality of RF channels of the MIMO DUT comprises measuring the at least one RF channel parameter for each of the plurality of RF channels of the MIMO DUT at same time as each other.

In some embodiments, the connection device comprises at least one switch connected to each of the probe antennas, and wherein measuring the at least one RF channel parameter for each of the plurality of RF channels of the MIMO DUT comprises controlling the at least one switch to sequentially connect the probe antennas to the at least one test instrument.

BRIEF DESCRIPTION OF THE DRAWINGS

The example embodiments are best understood from the following detailed description when read with the accompanying drawing figures. In fact, the dimensions may be arbitrarily increased or decreased for clarity of discussion. Wherever applicable and practical, like reference numerals refer to like elements.

DETAILED DESCRIPTION

In the following detailed description, for purposes of explanation and not limitation, example embodiments disclosing specific details are set forth in order to provide a thorough understanding of an embodiment according to the present teachings. However, it will be apparent to one having ordinary skill in the art having had the benefit of the present disclosure that other embodiments according to the present teachings that depart from the specific details disclosed herein remain within the scope of the appended claims. Moreover, descriptions of well-known apparati and methods may be omitted so as to not obscure the description of the example embodiments. Such methods and apparati are clearly within the scope of the present teachings.

Unless otherwise noted, when a first device is said to be connected to a second device, this encompasses cases where one or more intermediate devices may be employed to connect the two devices to each other. However, when a first device is said to be directly connected to a second device, this encompasses only cases where the two devices are connected to each other without any intermediate or intervening devices. Similarly, when a signal is said to be coupled to a device, this encompasses cases where one or more intermediate devices may be employed to couple the signal to the device. However, when a signal is said to be directly coupled to a device, this encompasses only cases where the signal is directly coupled to the device without any intermediate or intervening devices.

Figure 1:
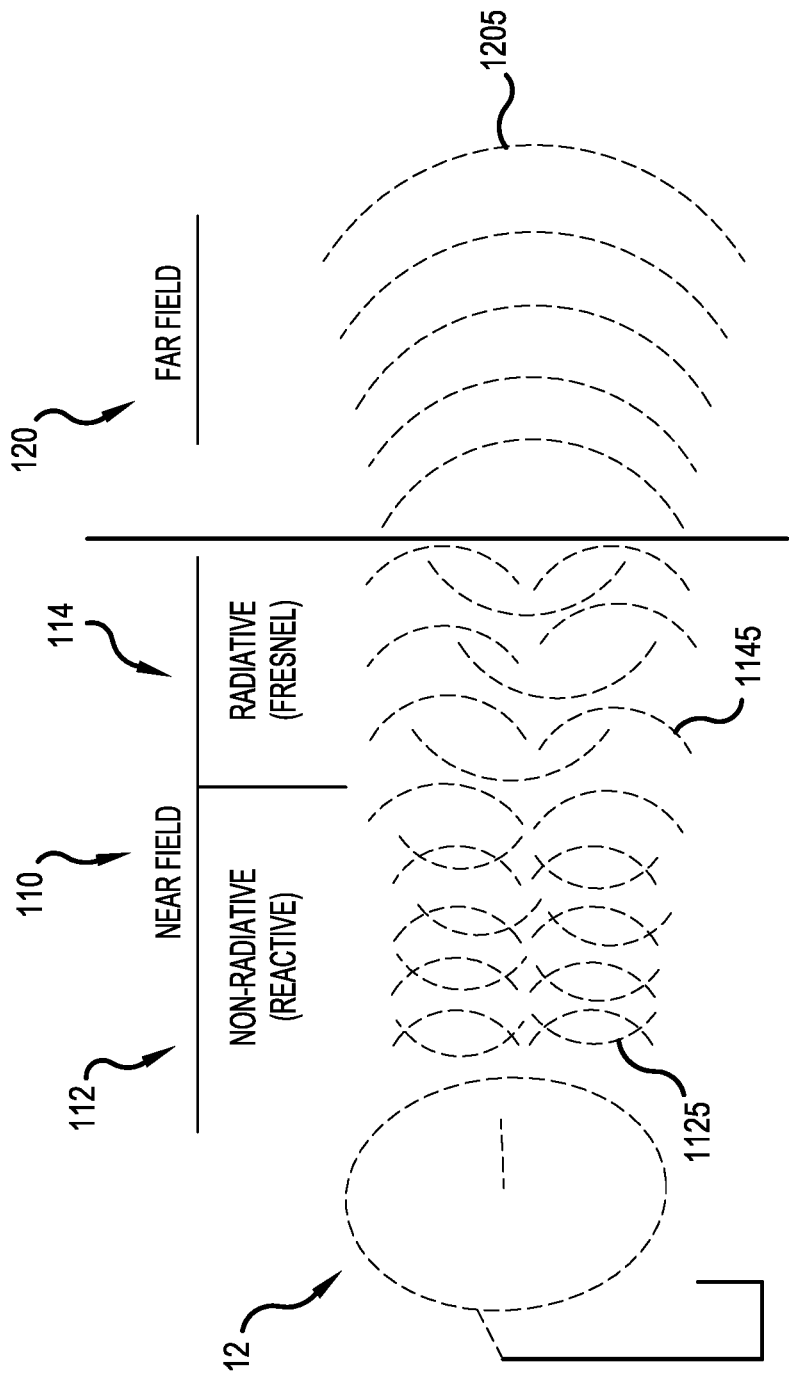
FIG. 1 illustrates near field and far field regions of an electromagnetic field around an object, such as a transmitting antenna.

FIG. 1 illustrates a near field region 110 and a far field region 120 of an electromagnetic field around an object, such as a transmitting antenna of a massive multi-input/multi-output (MIMO) communication system or device. Near field region 110 may be further divided into a non-radiative (reactive) near field region 112 having wavefronts 1125 and a radiative (Fresnel) near field region 114 having wavefronts 1145.

It is understood by those skilled in the art that FIG. 1 is simplified, and the transition of wavefronts from wavefronts 1145 in radiative near field region 114 to far field wavefronts 1205 in far field region 120 is actually gradual, and may be considered as occurring in a transition region (nor shown), rather than occurring sharply at a dividing line as illustrated in FIG. 1 for simplification.

Non-radiative "near field" behaviors of electromagnetic fields dominate close to the antenna or scattering object, while electromagnetic radiation "far field" behaviors dominate at greater distances. Far field E and B field strength decreases inversely with distance from the source, resulting in an inverse-square law for the radiated power intensity of electromagnetic radiation as a function of distance in the far field. By contrast, near field E and B strength decrease more rapidly with distance (with inverse-distance squared or cubed), resulting in a relative lack of near field effects within a few wavelengths of the radiator.

For antennas physically larger than a half-wavelength of the radiation they emit, the near and far fields are defined in terms of the Fraunhofer distance. The Fraunhofer distance, named after Joseph von Fraunhofer, is given by $d_f=2D^2/\lambda$, where D is the largest dimension of the radiator (or the diameter of the antenna) and $\lambda$ is the wavelength of the radio wave. The Fraunhofer distance, $d_f$, provides the dividing line between the near field and the far field.

More specifically, referring to FIG. 1, near field region 110 is that part of the radiated field that is at distances which are less the Fraunhofer distance, $d_f=2D^2/\lambda$, from the antenna of length or diameter D, where $\lambda$ is the wavelength of the radiating signal, whereas far field region 120 is that part of the radiated field that is at distances which are greater than the Fraunhofer distance from the antenna.

In general, three major types of over-the-air (OTA) tests are required for massive multi-input, multi-output (MIMO) wireless communication systems and terminals: (1) multiple channel calibration, including inter-channel amplitude, phase, delay calibration, and RF channel spectral flatness calibration; (2) radio frequency (RF) parametric measurement for each channel of the system, including per-channel Error Vector Magnitude (EVM), Adjacent Channel Leakage Ratio (ACLR), Spectrum Emission Mask (SEM), Adjacent Channel Selectivity (ACS), etc.; (3) Beamforming performance, such as beam gain, beam width of main lobe, etc.

Multiple channel calibration of a MIMO wireless communication system or terminal is usually performed with a reactive near field OTA test system or a far field OTA test system. In calibration approaches using a reactive field test system, a probe antenna is pointed close to a single antenna element of the MIMO wireless communication system and measures the RF parameters (phase/amplitude/delay, etc.) of this single RF channel at one time. Thus, a mechanical scanning of the probe antenna is required to measure the RF parameters of all the channels of the MIMO wireless communication system, and as a result the calibration speed is very slow. In calibration approaches using a far field OTA test system, in order to satisfy the far field condition, the size of the far field chamber should be very large for testing the large scale antenna array of the MIMO wireless communication system, which tends to be very expensive.

Per-channel RF parametric measurement can be performed in both radiative near field region 114 and far field region 120, but because the probe antenna will receive all the transmitting signals from different active RF channels of the of the MIMO wireless communication system, in order to remove the inter-channel interference only one RF channel can be turned on at a time during the test. Accordingly, per-channel RF parametric measurement will be very slow. What's more, for some RF parameter measurements such as ACLR, ACS, etc. which require high receiving sensitivity and a large dynamic range, because these metrics involve in/out band noise whose power level is very low, a far field test approach will suffer from large path losses and is not suitable for testing these OTA metrics.

Beamforming performance can be measured in both radiative near field region 114 and far field region 120. However, both require 3-dimensional scanning to measure the beam pattern, which is time consuming.

As discussed above, in general any single existing OTA test method and system by itself cannot address all the requirements for obtaining the various kinds of OTA measurement metrics which are typically required for a massive MIMO wireless system. On the other hand, using multiple different OTA test systems will increase the cost of the testing. Also, in many OTA test scenarios, such as OTA testing in manufacturing, the OTA test approach needs to be fast (due to the large number of DUTs to be tested) and cost effective, and traditional OTA test approaches are not suitable due to either the test speed being inadequate or the cost being too great.

Thus the inventors have determined that it would be desirable to provide an improved method and system to test and calibrate the performance of a multi-input/multi-output communication system or device.

Figure 2:
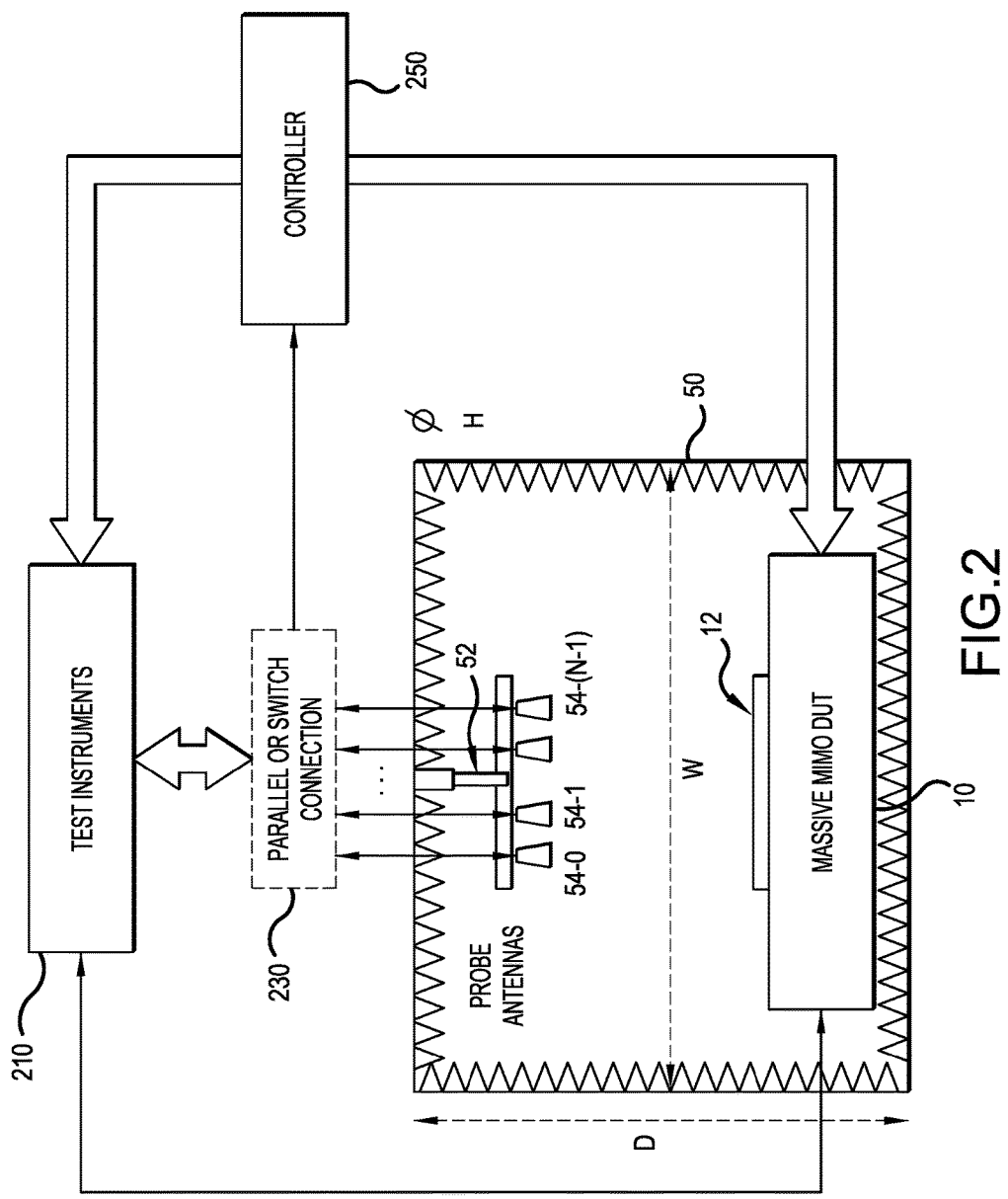
FIG. 2 illustrates an example embodiment of an over-the-air (OTA) test system for testing a multi-user, multi-input/multi-output (MIMO) communication system or device under test (DUT).

FIG. 2 illustrates an example embodiment of an over-the-air (OTA) test system 200 for testing a multi-user, multi-input/multi-output (MIMO) communication system or device under test (DUT) 10. OTA test system 200 includes: an over-the-air (OTA) test chamber 50 having a plurality of RF probe antennas 54-0, 54-1 ... 54-(N−1) disposed therein; a connection device 230 configured to connect the probe antennas to at least one test instrument; and a controller 250 configured to control OTA test system 200 to test MIMO DUT 10.

MIMO DUT 10 includes a MIMO transceiver, in particular a MIMO wireless RF transceiver and an array 12 of MIMO antenna elements for transmitting and receiving wireless RF signals over-the-air. Here it is understood that the term "RF" encompasses frequencies which may be considered to fall within UHF and/or microwave and/or mm wave bands. In some embodiments, MIMO DUT 10 may comprise a base station or repeater for a wireless communication system, such as a mobile telephony system. MIMO DUT 10 may include a MIMO baseband module communicating with one or more baseband interfaces of MIMO DUT 10, and a MIMO RF module communicating with RF inputs/outputs of MIMO DUT 10, which are in turn connected to array 12 of RF antennas. In example embodiments, the baseband interface(s) may comprise one or more electrical and/or optical interfaces.

In some embodiments, MIMO DUT 10 comprises a massive MIMO system wherein array 12 has a large number of antennas or antenna elements. In some embodiments, array 12 may have at least N=64 antennas or antenna elements. In some embodiments, array 12 may have N=400 or more antennas or antenna elements.

OTA test chamber 50 may comprise a compact anechoic chamber which is configured to receive MIMO DUT 10 therein during a test of MIMO DUT 10 such that RF probe antennas 54-0 ... 54-(N−1) are located in a near field region 110 of array 12 of MIMO antenna elements. RF probe antennas 54-0 ... 54-(N−1) are configured to radiate and receive RF signals. In some embodiments, RF probe antennas 54-0 ... 54-(N−1) are mounted or fixed to one or more telescopic booms 52 which are in turn mounted or connected to interior surfaces of the walls of OTA test chamber 50.

Beneficially, OTA test chamber 50 may be compact in size, for example in comparison to an operating wavelength of MIMO DUT 10. In particular, OTA test chamber 50 may have a size such that RF probe antennas 54-0 ... 54-(N−1) are located within near field region 110 of array 12 of MIMO DUT 10. In some embodiments, an interior width W of OTA test chamber 50 may be less than one meter (e.g., 0.5 meter) greater than a width of MIMO DUT 10, an interior height H of OTA test chamber 50 may be less than one meter (e.g., 0.5 meter) greater than a height of MIMO DUT 10, and an interior depth D of OTA test chamber 50 may be less than one meter greater than a length of MIMO DUT 10. That is, the size of OTA test chamber 50 may be slightly larger than that of MIMO DUT 10.

Test instrument(s) 210 may comprise one or more of a variety of devices, such as power meter(s), spectrum analyzer(s), vector analyzer(s), RF signal generator(s), network analyzer(s), etc. Beneficially, test instrument(s) 210 may comprise one or more multi-channel devices capable of processing in parallel multiple signals to or from RF probe antennas 54-0 ... 54-(N−1).

In various embodiments, connection device 230 may comprise a parallel and/or switch connection between test instrument(s) 210 and RF probe antennas 54-0 ... 54-(N−1) of OTA test chamber 50. The plurality of RF probe antennas 54-0 ... 54-(N−1) can either be connected to test instrument(s) 210 in parallel, or connected to a single channel test instrument 210 by switching. Beneficially, no mechanical movement may be required or needed during OTA testing of MIMO DUT 10, so that the measurements may be much faster than traditional OTA test approaches that need mechanical scanning or rotation. If test system 200 employs a connection device 230 which supports parallel connections between RF probe antennas 54-0 ... 54-(N−1) and a multi-channel test instrument 210, the test speed can be further improved.

Controller 250 may include one or more digital microprocessors and memory, which may include volatile and/or nonvolatile memory, including random access memory (RAM), read only memory—for example electrically erasable programmable read only memory (EEPROM), FLASH memory, etc. In some embodiments, the memory may store instructions to be executed by the digital microprocessor(s) to cause the digital microprocessor(s) to perform one or more algorithms for controlling operations of test system 100. In some embodiments, controller 250 may comprise a general purpose computer, such as a personal computer (PC), executing instructions of a software algorithm for performing one or more tests on MIMO DUT 10, including measuring or ascertaining one or more performance characteristics of MIMO DUT 10.

As will be described in greater detail below, controller 250 is configured to control the system to test MIMO DUT 10. In some embodiments, controller 250 is configured to control the system to test MIMO DUT 10 by: controlling the test instrument(s) 210 to measure at least one calibration parameter for array 12 of MIMO antenna elements of MIMO DUT 10 using the plurality of RF probe antennas 54-0 . . . 54-(N−1); measuring at least one radio frequency (RF) channel parameter for each of a plurality of RF channels of the MIMO DUT using the plurality of RF probe antennas 54-0 . . . 54-(N−1) disposed within OTA test chamber 50 and located in near field region 110 of the MIMO antenna elements, measuring a first near field intensity of a near field radiation pattern produced by the MIMO antenna elements within OTA test chamber 50 at a first point along a central axis orthogonal to the array 12 of the MIMO antenna elements, measuring additional near field intensities of the near field radiation pattern produced by the MIMO antenna elements within OTA test chamber 50 at a plurality of other points disposed along a first circle defining an expected beamwidth of a main lobe of a far field radiation pattern of the MIMO antenna elements, and applying a mapping relationship to the measured near field intensities of the near field radiation pattern to ascertain a beam gain, and a beam width of the main lobe, of the far field radiation pattern for the MIMO antenna elements.

Figure 3:
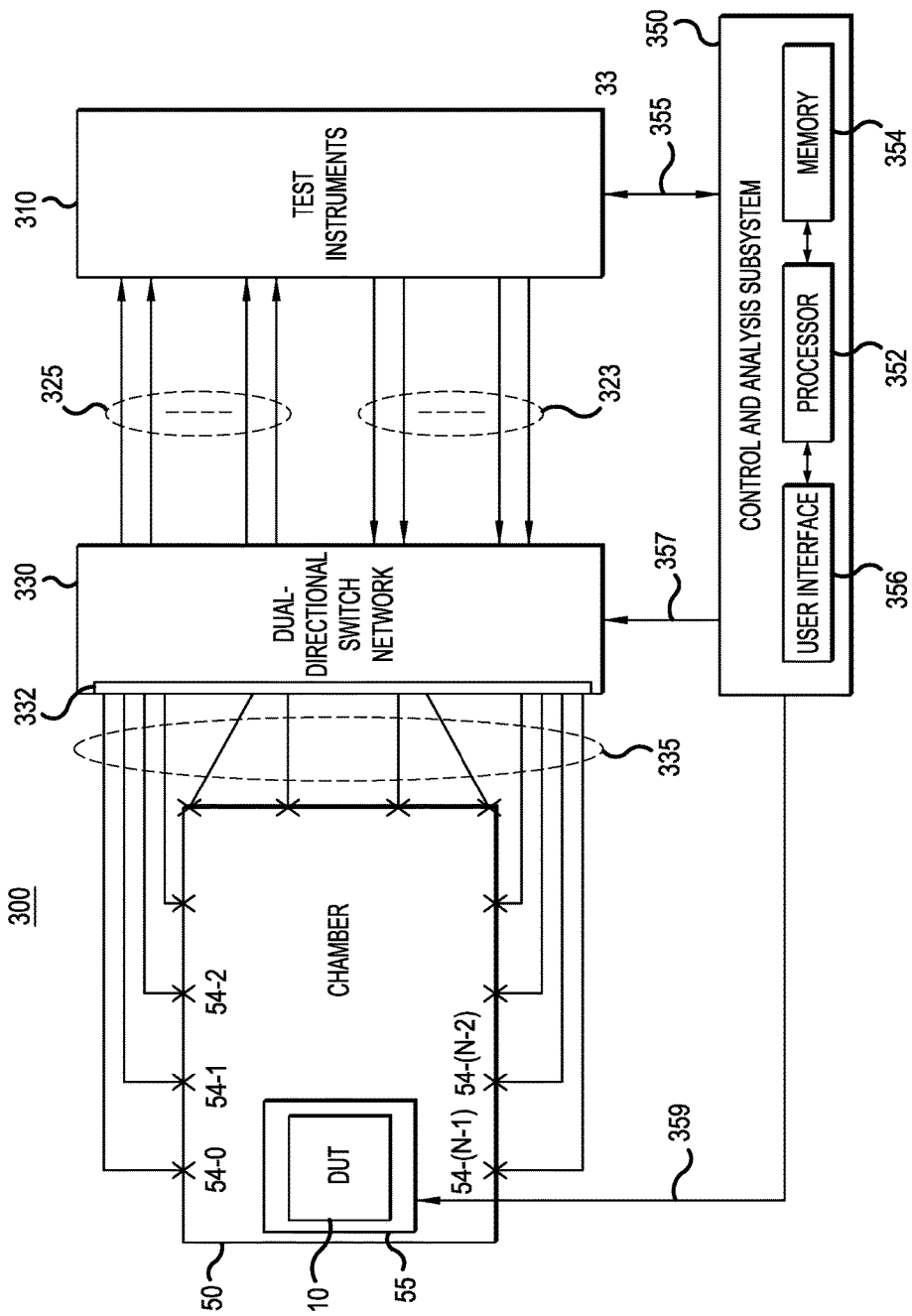
FIG. 3 is a functional block diagram of an example embodiment of an OTA test system for testing a MIMO communication system or DUT.

FIG. 3 is a functional block diagram of an example embodiment of an OTA test system 300 for testing a MIMO communication system or DUT 10. OTA test system 300 may be one embodiment of OTA test system 200 of FIG. 2.

OTA test system 300 includes: one or more test instruments 310; a bi-directional or dual-directional switch network 320; N RF probe antennas RF probe antennas 54-0 . . . 54-(N−1), and OTA test chamber 50 into which RF probe antennas 54-0 . . . 54-(N−1) disposed and configured to radiate and receive RF signals.

As illustrated in FIG. 3, OTA test system 300 further includes a control and analysis subsystem 350 which may load configurations and/or control operations of test instrument(s) 310 and dual-directional switch network 330. Control and analysis subsystem 350 may include one or more digital microprocessors and memory, which may include volatile and/or nonvolatile memory, including random access memory (RAM), read only memory—for example electrically erasable programmable read only memory (EEPROM), FLASH memory, etc. In some embodiments, the memory may store instructions to be executed by the digital microprocessor(s) to cause the digital microprocessor(s) to perform one or more algorithms for controlling operations of test system 100. In some embodiments, control and analysis subsystem 350 may comprise a general purpose computer, such as a personal computer (PC), executing instructions of a software algorithm for performing one or more tests on MIMO DUT 10, including measuring or ascertaining one or more performance characteristics of MIMO DUT 10.

As illustrated in FIG. 3, control and analysis subsystem 350 includes one or more processor(s) 352, memory 354, and a user interface 356. User interface 356 may include one or more of a display, keyboard, keypad, touchscreen, mouse, trackball, microphone, etc. Although not shown in FIG. 3, control and analysis subsystem 350 further includes one or more input/output ports or communication ports for communicating control signals 355, 357 and 359. Although for ease of illustration FIG. 3 shows control signals 355, 357 and 359 as being communicated via separate interfaces, it should be understood that in some embodiments MIMO DUT 10, test instruments 310, dual-directional switch network 330 and control and analysis subsystem 350 may communicate via a shared communication bus, for example using a standard protocol, such as Ethernet.

Optionally, OTA test system 300 includes a movable mounting structure or movable platform 55 to which MIMO DUT 10 is mounted or fixed and by means of which a position and orientation of MIMO DUT 10 within OTA test chamber 50 may be adjusted or controlled. In some embodiments, movable platform 55 may be configured to translate, rotate and/or pivot MIMO DUT 10 in two or three dimensions in response to one or more control signals, for example one or more control signals 359 from control and analysis subsystem 350.

In some embodiments of OTA test system 300, movable platform 55 may be omitted.

Figure 4:
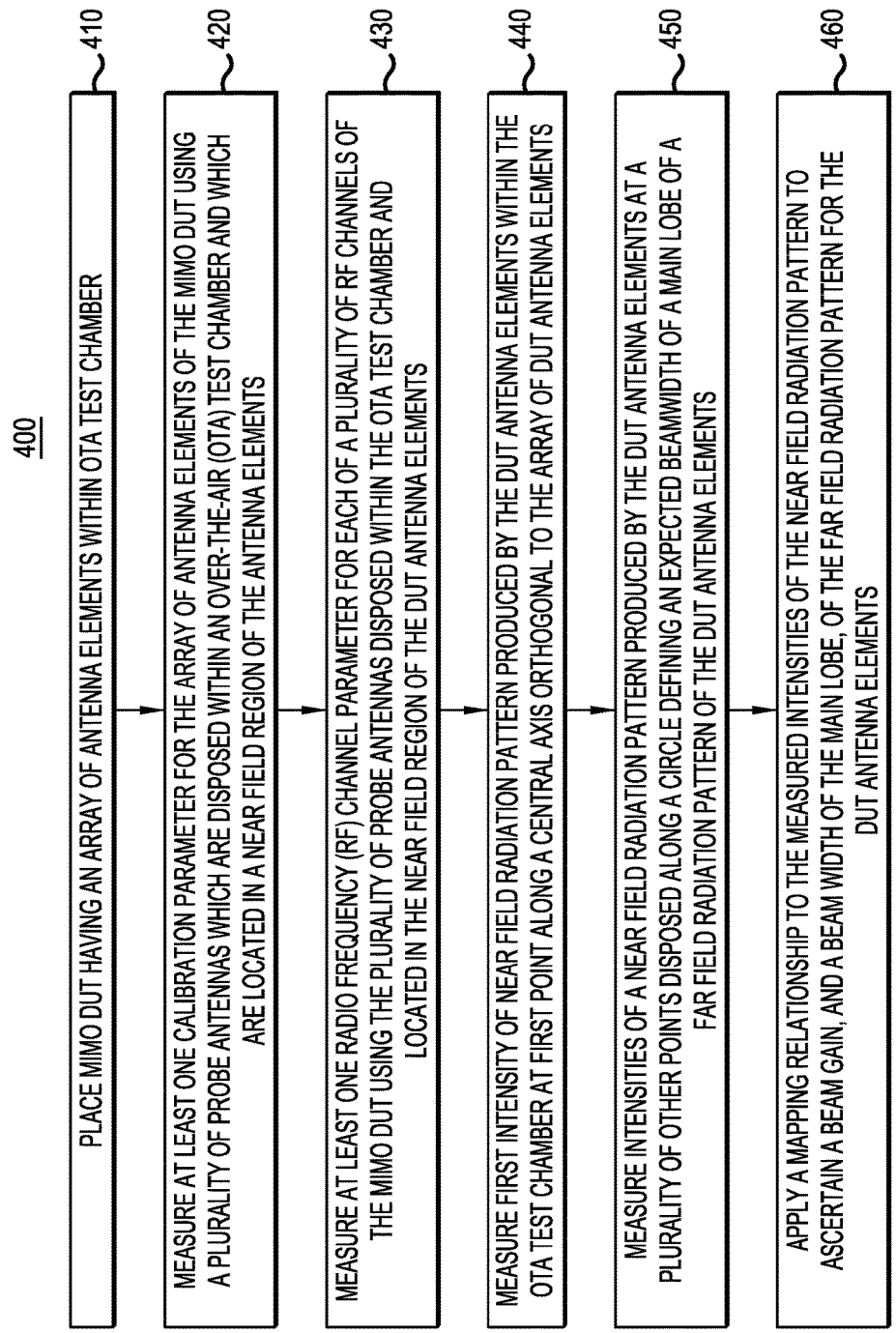
FIG. 4 is a flowchart of an example embodiment of a method of testing a MIMO communication system or DUT.

FIG. 4 is a flowchart of an example embodiment of a method 400 of testing a MIMO communication system or DUT, for example using an OTA test system, for example OTA test system 200 or 300.

In an operation 410, a MIMO DUT (e.g., MIMO DUT 10) having an array (e.g., array 12) of MIMO antenna elements is placed within an OTA test chamber (e.g., OTA test chamber 50).

An operation 420 includes measuring at least one calibration parameter for array 12 of MIMO antenna elements of MIMO DUT 10 using a plurality of probe antennas (e.g., RF probe antennas 54-0 . . . 54-(N−1) which are disposed within OTA test chamber 50 and which are located in near field region 110 of the MIMO antenna elements.

An operation 430 includes measuring at least one radio frequency (RF) channel parameter for each of a plurality of RF channels of MIMO DUT 10 using the plurality of RF probe antennas 54-0 . . . 54-(N−1) which are disposed within OTA test chamber 50 and which are located in near field region 110 of the MIMO antenna elements of MIMO DUT 10.

An operation 440 includes measuring a first intensity of the near field radiation pattern produced by the MIMO antenna elements of MIMO DUT 10 within OTA test chamber 50 at a first point along a central axis orthogonal to array 12 of MIMO antenna elements of MIMO DUT 10 (the 0,0 direction).

An operation 450 includes measuring intensities of the near field radiation pattern produced by the MIMO antenna elements of MIMO DUT 10 at a plurality of other points *e.g., 4 points or 8 points) disposed along a circle defining an expected 3 dB beamwidth of a main lobe of the far field radiation pattern of the MIMO antenna elements.

An operation 460 includes applying a mapping relationship to the measured intensities of the near field radiation pattern to ascertain a beam gain, and a beam width of the main lobe, of the far field radiation pattern for the MIMO antenna elements of MIMO DUT 10.

It should be understood that the order of operations 420-460 may be different than the order shown in FIG. 4. For example, the order of operations 420, 430 and 440-460 may be rearranged in any order.

Further details of embodiments of operations of method 400, performed with an OTA test system such as OTA test system 200 or 300, will now be described.

Operation 420: Multiple Channel Parallel Calibration.

In the OTA test systems 200 and 300, a single RF probe antenna 54-0 ... 54-(N−1) may receive test signals from (or transmit test signals to) multiple RF channels of MIMO DUT 10 simultaneously to accelerate the calibration speed.

If the RF channels in MIMO DUT 10 have independent baseband channels (e.g., array 12 is a digital phased antenna array), the RF performance test method presented in U.S. Patent Application Publication 2016/0337052, published on 17 Nov. 2016, in the names of Zhu Wen, et al., which is incorporated herein by reference, can be used to separate the test signal of each channel by applying different delay shifts to different channels. If some RF channels share the same baseband channel and MIMO DUT 10 uses an analog phase shifter to do beamforming, such as a hybrid or analog beamforming system, the method presented in defensive publication "Radiated Power And Phase Calibration Of A Multichannel Signal Transmitter," IP.COM disclosure number: IPCOM000249094D, published on 3 Feb. 2017 in the names of Ya Jing et al., which is incorporated herein by reference, can be used to separate signals of each channel by apply different phase patterns to different channels.

One issue needs to be considered is that in a compact OTA test chamber 50, the distance between RF probe antenna 54-0, for example, and MIMO DUT 10 does not satisfy the ideal far field condition. Accordingly, the difference in distance from RF probe antenna 54-0 to different MIMO antenna elements of array 12 cannot be ignored, which will mainly result in a phase calibration error.

To address this problem, in various embodiments the following two approaches, both of which involve using multiple RF probe antennas 54-0 ... 54-(N−1), may be employed.

A first and more generic approach is, based on the Time Difference of Arrival (TDOA) information from a MIMO antenna element to multiple RF probe antennas 54-0 ... 54-(N−1). In this approach, TDOA location algorithms (e.g., the Chan algorithm) may be employed to estimate the position of the MIMO antenna element, and then calculate the distance between RF probe antennas 54-0 ... 54-(N−1) and the MIMO antenna element based on the positions of RF probe antennas 54-0 ... 54-(N−1) and the MIMO antenna element.

Figure 5:
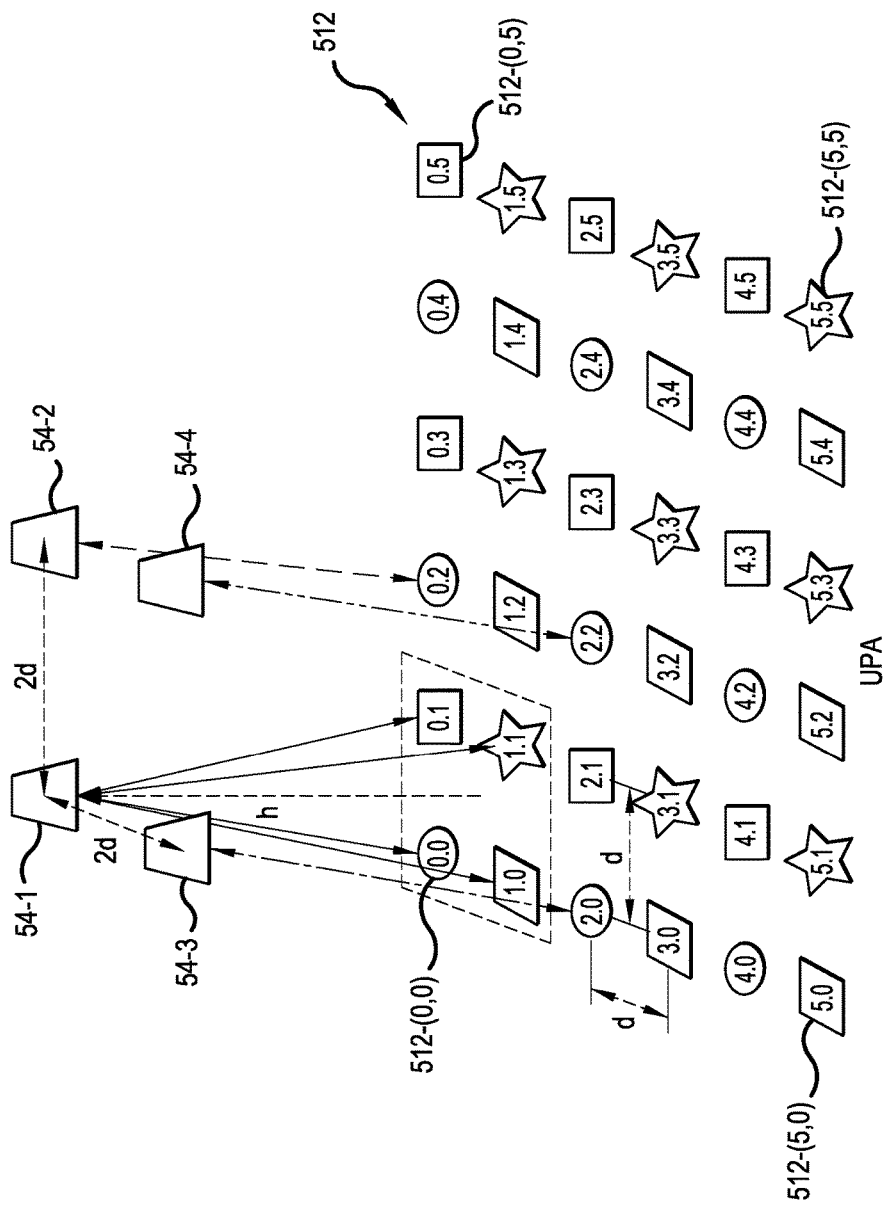
FIG. 5 is a drawing for illustrating a method of calibrating a uniform planar array (UPA) antenna via a plurality of sub-arrays.

A second approach is simpler and suitable for high frequency OTA test (e.g., in an OTA test of a MIMO DUT 10 operating in mm wave frequencies) and is illustrated in FIG. 5.

In this approach, we suppose that array 12 is a uniform planar array (UPA) 512 comprising a plurality of MIMO antenna elements 512-(0,0) ... 512-(0,5) ... 512-(5,0) ... 512-(0,5), and the distance between adjacent MIMO antenna elements 512-(0,0) ... 512-(0,5) ... 512-(5,0) ... 512-(0,5) of UPA 512 is d. In that case, the distance between adjacent RF probe antennas 54-1, 54-2, 54-3 and 54-4 is set to be an integer multiple of d, e.g., 2d. Here, RF probe antennas 54-1, 54-2, 54-3 and 54-4 are disposed parallel to UPA 5120 with a distance of h.

From RF probe antenna 54-1, we can measure the phase of all the MIMO antenna elements 512-$(i, j)$ denoted as $\{\theta_{i,j}^1, i,j=0, 1, 2, \ldots\}$, where $$\theta_{i,j}^1 = \theta_{i,j} + \frac{2\pi d_{i,j}^1}{\lambda},$$

$\theta_{i,j}$ where is the phase of RF channel of MIMO antenna element 512-$(i, j)$, the second term in the right is the phase caused by the distance between RF probe antenna 54-1 and MIMO antenna element 512-$(i, j)$, which needs to be compensated for in the calibration.

Also, from RF probe antennas 54-2, 54-3 and 54-4, we can measure the phases of all the MIMO antenna elements 512-$(i, j)$ denoted as $\{\theta_{i,j}^k, k=2, 3, 4\ i,j=0, 1, 2, \ldots\}$, where $$\theta_{i,j}^k = \theta_{i,j} + \frac{2\pi d_{i,j}^k}{\lambda}$$

Noting that the distance between two adjacent RF probe antennas 54-1 ... 54-4 is 2d, we have $d_{i,j}^1 = d_{i+2,j}^2 = d_{i,j+2}^3 = d_{i+2,j+2}^4$, then we can get the RF channel phase difference by:

$$\Delta\theta_{i+2,j} = \theta_{i+2,j}^2 - \theta_{i,j}^1 \quad (1)$$

$$\Delta\theta_{i,j+2} = \theta_{i,j+2}^3 - \theta_{i,j}^1 \quad (2)$$

$$\Delta\theta_{i+2,j+2} = \theta_{i+2,j+2}^4 - \theta_{i,j}^1 \quad (3)$$

We can separate all the MIMO antenna elements in UPA 512 into 4 groups, and in each group, select the closest element to RF probe antenna 54-1 (MIMO antenna element 512-(0,0), 512-(0,1), 512-(1,0), and 512-(1,1) in FIG. 5) as the reference MIMO antenna element, and calibrate the phase inside each group to be equal to the reference MIMO antenna element in the group.

The geometric distance difference among the four reference MIMO antenna elements to RF probe antenna 54-1 are small enough to be ignored, so the whole UPA 512 has been calibrated.

Operation 430: Multiple Channel RF Performance Parallel Measurement.

Figure 6:
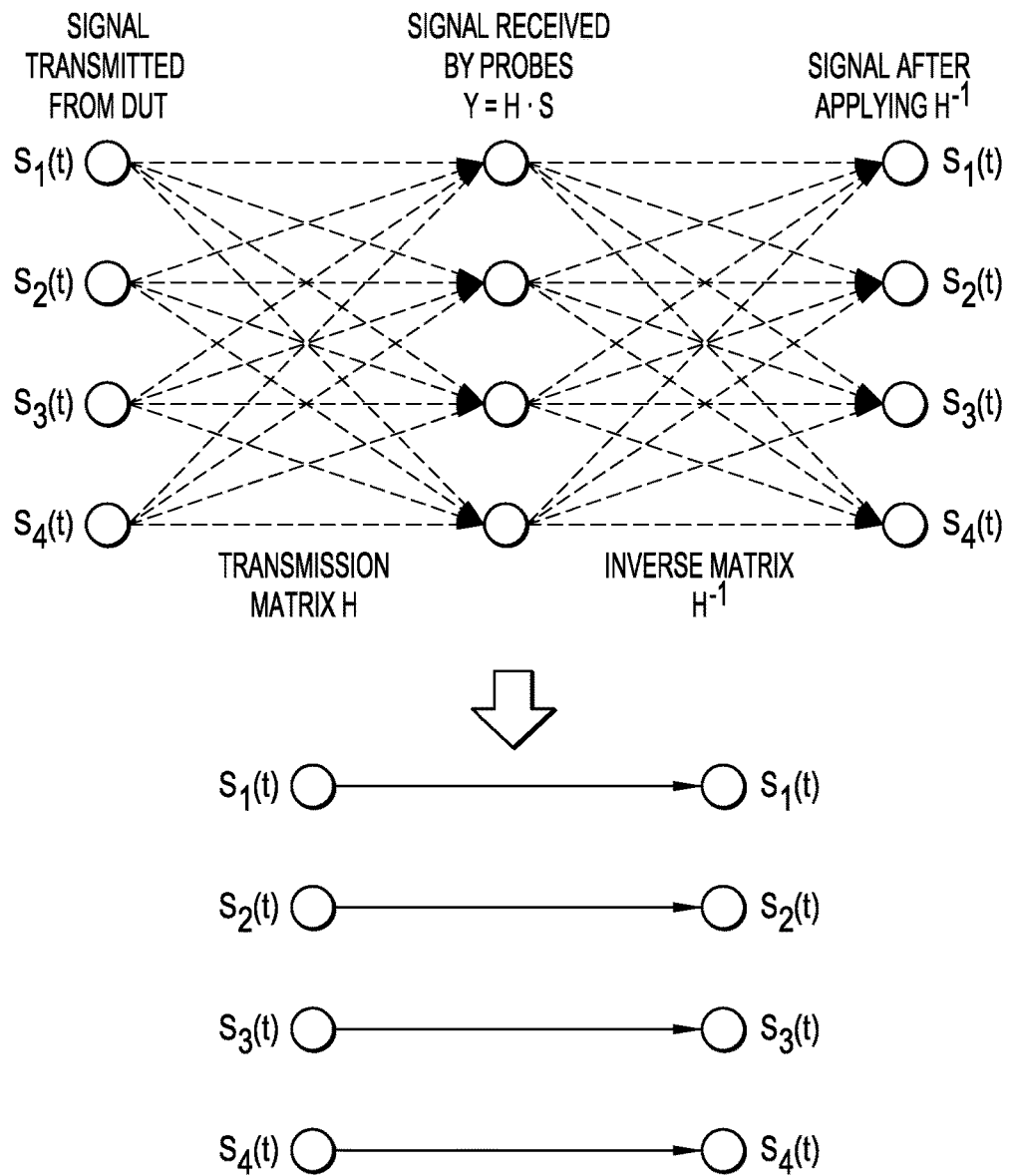
FIG. 6 is a drawing for illustrating how multiple RF channels of a MIMO DUT can be tested in parallel simultaneously by means of an OTA chamber having a plurality of probe antennas.

In some embodiments of operation 430, multiple RF probe antennas 54-0 ... 54-(N−1) are used to perform multi-channel RF performance measurements for MIMO DUT 10 in parallel, which can greatly accelerate the measurement speed. The concept of parallel RF performance measurement is described with respect to FIG. 6 as follows.

Suppose each RF channel of MIMO DUT 10 can be turned on/off independently. When multiple RF channels of MIMO DUT 10 are turned on at the same time (the number of active RF channels should be equal or less than the number of RF probe antennas, N) to transmit signals $S_1(t)$, $S_2(t)$, $S_3(t)$, $S_4(t)$, etc., if the transmission matrix H between multiple MIMO antenna elements under test with the multiple RF probe antennas 54-0 ... 54-(N−1) (Y=H·S) has a good condition number (near 1), then we can measure the transmission matrix H and then apply the inverse of the matrix, $H^{-1}$, to remove the cross-channel interference, so as we can treat the OTA channel as a unit matrix.

Theoretical analysis shows that if the distance between RF probe antennas 54-0 ... 54-(N−1) is about ⅕ of the distance between the RF probe antennas 54-0 ... 54-(N−1) and array 12 of MIMO DUT 10, it is easy to pick up suitable MIMO antenna elements which make the transmission matrix with a condition number less than 2.

Operations 440-460: Beamforming Test.

In the context of manufacturing qualification tests on a MIMO DUT 10, with an OTA test system such as OTA test system 200 or OTA test system 300, typically it is not necessary to measure the whole beamforming pattern of array 12 of MIMO DUT 19, but only the beam gain and 3 dB beam width of the main lobe are required to be tested.

Figure 7:
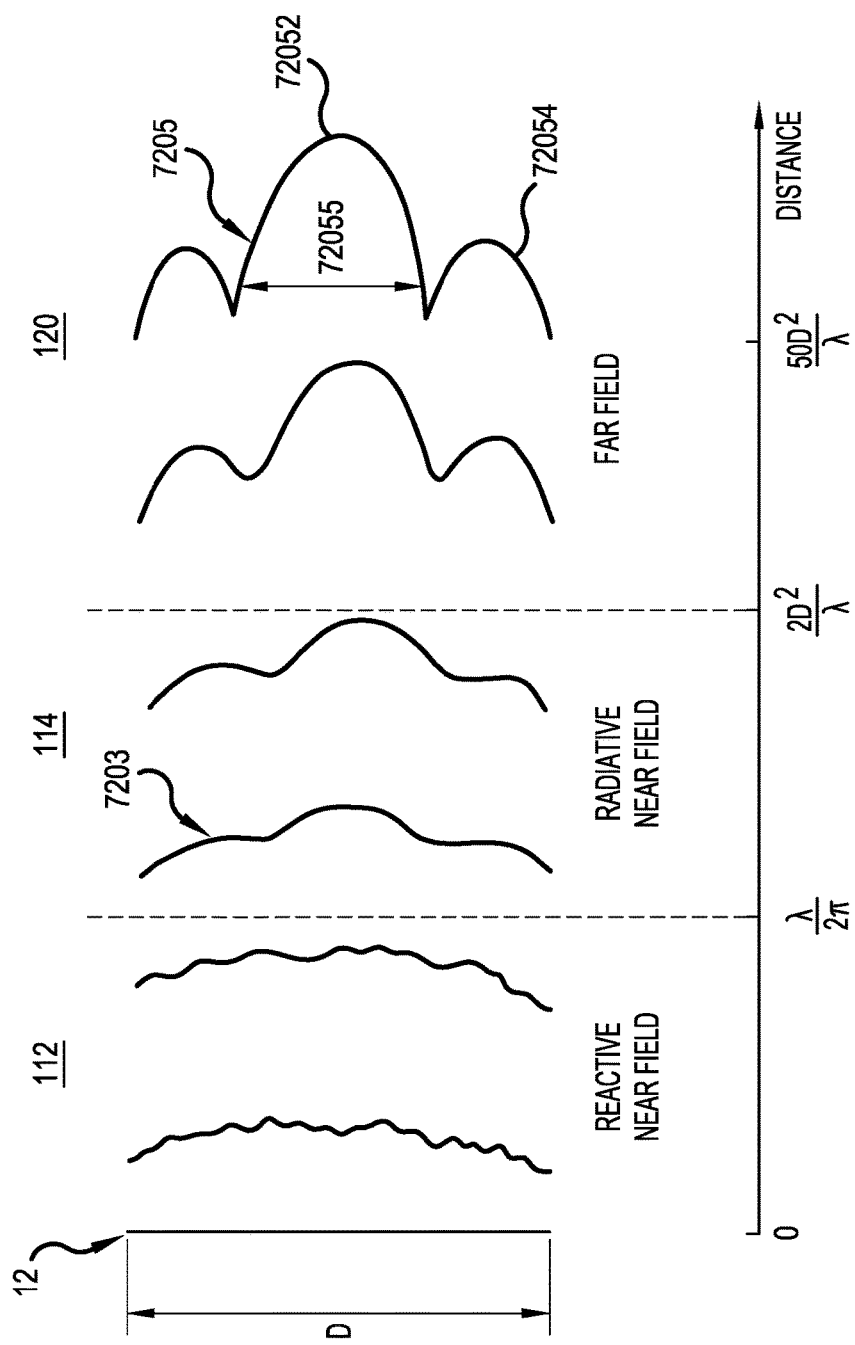
FIG. 7 illustrates relationships between an example near field radiation pattern and an example far field radiation pattern of an antenna.

FIG. 7 illustrates relationships between example near field radiation pattern 7203 and far field radiation pattern 7205 of an antenna array 12 of dimension D. FIG. 7 shows the main lobe 72052 and side lobes 72054 of far field radiation pattern 7205.

As can be seen in FIG. 7, in radiative near field region 114, even though near field radiation pattern 7203 is quite different from far field radiation pattern 7205, one can still note that the pattern shape, especially the shape of main lobe 72052, can easily be observed in the radiative near field radiation pattern 7203 and the main lobe direction is close to the far field main lobe. Accordingly, it is possible to build a mapping relationship between radiative near field radiation pattern 7203 and far field radiation pattern 7205, and then only perform the beamforming measurements on MIMO DUT 10 in radiative near field 114 using OTA test system 200 or 300 with compact size OTA test chamber 50.

Figure 8:
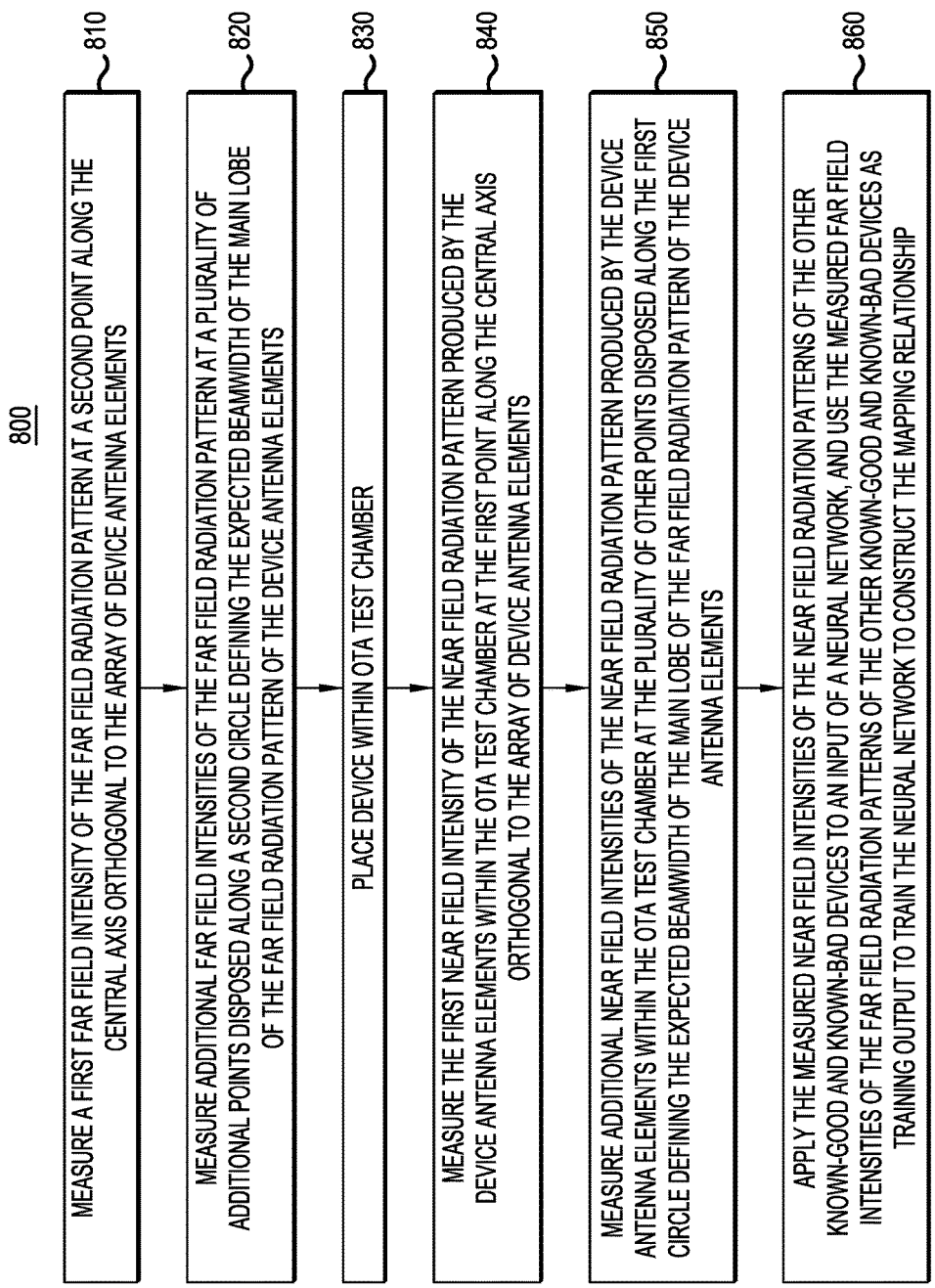
FIG. 8 is a flowchart of an example embodiment of a method of constructing a mapping relationship between measured near field intensities of a near field radiation pattern of MIMO antenna elements to a far field radiation pattern for the MIMO antenna elements.

FIG. 8 is a flowchart of an example embodiment of a method 800 of constructing a mapping relationship between measured near field intensities of a near field radiation pattern, such as radiative near field radiation pattern 7203, of MIMO antenna elements to a far field radiation pattern, such as far field radiation pattern 7205, for the MIMO antenna elements.

For executing method 800, first a small set of MIMO DUTs 10 are selected as reference devices. Beneficially the set includes a set of "known good" devices which are known to meet their performance specifications, and a set of "known bad" devices which are known to not meet their performance specifications.

The operations 810 through 850 of method 800 are then performed for each of the selected reference devices.

Operation 810 includes measuring a first far field intensity of the far field radiation pattern of the selected reference device at a point (here denoted as a "second point" in contrast to the "first point" of method 400 above) along the central axis orthogonal to the array of the reference device's antenna elements (the same 0,0 beam direction for which the near field radiation pattern was measured at the first point in operation 440 of method 400 above).

An operation 820 includes measuring additional far field intensities of the far field radiation pattern of the selected reference device at a plurality of additional points (e.g., 4 or 8 points) disposed along a second circle defining the expected 3 dB beamwidth 72055 of main lobe 72052 of far field radiation pattern 7205 of the antenna elements of the selected reference device.

An operation 830 includes placing the selected reference device with OTA test chamber 50.

An operation 840 includes measuring a first near field intensity of near field radiation pattern 7203 produced by the antenna elements of the selected reference device within OTA test chamber 50 at the first point along the central axis orthogonal to the array of antenna elements (0,0 beam direction).

Operation 850 includes measuring additional near field intensities of the near field radiation pattern 7203 produced by the antenna elements of the selected reference device within OTA test chamber 50 at the plurality of other points disposed along the first circle defining the expected 3 dB beamwidth of main lobe 72052 of far field radiation pattern 7205 of the antenna elements of the selected reference device.

Operation 860 includes applying the measured near field intensities of the near field radiation patterns of the selected known-good devices and known-bad devices to an input of a neural network, and using the measured far field intensities of the far field radiation patterns 7205 of the other known-good devices and known-bad devices as training output to train the neural network to construct the mapping relationship between near field radiation pattern 7203 and far field radiation pattern 7205. Operation 860 may be one embodiment of a method of employing the data obtained in operations 810-850 for constructing the mapping relationship which may be employed in operation 460 in method 400. In other embodiments, the data obtained in operations 810-850 may be processed in other ways to build the mapping relationship.

Once the mapping relationship is built, then operation 460 may be performed to applying the mapping relationship to the measured intensities of the near field radiation pattern of a MIMO DUT 10 in a manufacturing setting to ascertain a beam gain, and a beam width of the main lobe, of the far field radiation pattern for the MIMO antenna elements of MIMO DUT 10.

While example embodiments are disclosed herein, one of ordinary skill in the art appreciates that many variations that are in accordance with the present teachings are possible and remain within the scope of the appended claims. The invention therefore is not to be restricted except within the scope of the appended claims.

The invention claimed is:

1. A method of testing a multi-input, multi-output (MIMO) device under test (DUT) having an array of MIMO antenna elements, the method comprising:
   measuring at least one calibration parameter for the array of MIMO antenna elements of the MIMO DUT using a plurality of probe antennas which are disposed within an over-the-air (OTA) test chamber and which are located in a near field region of the MIMO antenna elements;
   measuring at least one radio frequency (RF) channel parameter for each of a plurality of RF channels of the MIMO DUT using the plurality of probe antennas which are disposed within the OTA test chamber and which are located in the near field region of the MIMO antenna elements;
   measuring a first near field intensity of a near field radiation pattern produced by the MIMO antenna elements within the OTA test chamber at a first point along a central axis orthogonal to the array of the MIMO antenna elements,
   measuring additional near field intensities of the near field radiation pattern produced by the MIMO antenna elements within the OTA test chamber at a plurality of other points disposed along a first circle defining an expected beamwidth of a main lobe of a far field radiation pattern of the MIMO antenna elements; and
   applying a mapping relationship to the measured first near field intensity and additional near field intensities of the near field radiation pattern to ascertain a beam gain, and a beam width of the main lobe, of the far field radiation pattern for the MIMO antenna elements.

2. The method of claim 1, wherein the plurality of probe antennas are mounted on a telescopic boom associated with the OTA test chamber and are located at fixed positions while measuring the at least one calibration parameter for the array of MIMO antenna elements.

3. The method of claim 1, wherein the at least one calibration parameter includes at least one of: an amplitude, a phase, a delay, and a frequency response of at least one RF channel of the MIMO DUT.

4. The method of claim 1, wherein measuring the at least one calibration parameter for each of the plurality of RF channels of the MIMO DUT includes applying different delay shifts to different ones of the RF channels of the MIMO DUT.

5. The method of claim 1, wherein measuring the at least one calibration parameter for each of the plurality of RF channels of the MIMO DUT includes applying different phase patterns to different ones of the RF channels.

6. The method of claim 1, wherein measuring the at least one calibration parameter includes applying a time difference of arrival (TDOA) algorithm to signals received at the probe antennas from the array of MIMO antenna elements to ascertain distances between each probe antenna and each antenna element.

7. The method of claim 1, wherein the array of MIMO antenna elements is a uniform planar array (UPA) having a uniform distance D between each pair of adjacent MIMO antenna elements, and wherein the probe antennas are uniformly spaced with a distance of N*D between each pair of adjacent probe antennas, where N is an integer, the method including:
measuring phases of each RF channel of each antenna element at each probe antenna; and
ascertaining distances between each probe antenna and each antenna element from the measured phases of each RF channel of each antenna element at each probe antenna and the integer N.

8. The method of claim 1, further comprising measuring the at least one RF channel parameter for each of the plurality of RF channels of the MIMO DUT at a same time as each other.

9. The method of claim 1, wherein measuring the at least one RF channel parameter for each of the plurality of RF channels of the MIMO DUT using the plurality of probe antennas includes:
measuring a transmission matrix of a wireless transmission channel between the MIMO DUT and the probe antennas; and
applying an inverse of the transmission matrix to signals received by the probe antennas to recover the signals transmitted from the MIMO DUT.

10. The method of claim 1, wherein the at least one RF channel parameter includes at least one of an error vector magnitude, an adjacent channel leakage ratio, a spectrum emission mask, an adjacent channel selectivity, an in-channel receiver sensitivity, a dynamic range, and a blocking.

11. The method of claim 1, further comprising:
for each of a plurality of other known-good devices and known-bad devices each having a corresponding array of device antenna elements, wherein the known-good devices are known to meet their performance specifications and the known-bad devices are known to not meet their performance specifications:
measuring a first far field intensity of the far field radiation pattern at a second point along the central axis orthogonal to the array of device antenna elements, and
measuring additional far field intensities of the far field radiation pattern at a plurality of additional points disposed along a second circle defining the expected beamwidth of the main lobe of the far field radiation pattern of the device antenna elements;
placing each of the other known-good and known-bad devices into the OTA test chamber;
for each of the other known-good and known-bad devices, one at a time:
measuring the first near field intensity of the near field radiation pattern produced by the device antenna elements within the OTA test chamber at the first point along the central axis orthogonal to the array of device antenna elements, and
measuring the additional near field intensities of the near field radiation pattern produced by the device antenna elements within the OTA test chamber at the plurality of other points disposed along the first circle defining the expected beamwidth of the main lobe of the far field radiation pattern of the device antenna elements; and
applying the measured near field intensities of the near field radiation patterns of the other known-good and known-bad devices to an input of a neural network, and using the measured far field intensities of the far field radiation patterns of the other known-good and known-bad devices as training output to train the neural network to construct the mapping relationship.

12. A system for testing a multi-input, multi-output (MIMO) device under test (DUT) having an array of MIMO antenna elements, the system comprising:
an over-the-air (OTA) test chamber having a plurality of probe antennas disposed therein, the OTA test chamber being configured to receive the MIMO DUT therein during a test of the MIMO DUT such that the probe antennas are located in a near field region of the array of MIMO antenna elements;
a connection device configured to connect the probe antennas to at least one test instrument; and
a controller configured to control the system to test the MIMO DUT by:
controlling the at least one test instrument to measure at least one calibration parameter for the array of MIMO antenna elements of the MIMO DUT using the plurality of probe antennas,
measuring at least one radio frequency (RF) channel parameter for each of a plurality of RF channels of the MIMO DUT using the plurality of probe antennas disposed within the OTA test chamber and located in the near field region of the MIMO antenna elements,
measuring a first near field intensity of a near field radiation pattern produced by the MIMO antenna elements within the OTA test chamber at a first point along a central axis orthogonal to the array of the MIMO antenna elements,
measuring additional near field intensities of the near field radiation pattern produced by the MIMO antenna elements within the OTA test chamber at a plurality of other points disposed along a first circle defining an expected beamwidth of a main lobe of a far field radiation pattern of the MIMO antenna elements, and
applying a mapping relationship to the measured first near field intensity and additional near field intensities of the near field radiation pattern to ascertain a beam gain, and a beam width of the main lobe, of the far field radiation pattern for the MIMO DUT antenna elements.

13. The system of claim 12, wherein an interior width of the OTA test chamber is less than one meter greater than a width of the MIMO DUT, an interior height of the OTA test chamber is less than one meter greater than a height of the MIMO DUT, and an interior depth of the OTA test chamber is less than one meter greater than a length of the MIMO DUT.

14. The system of claim 12, wherein the at least one test instrument comprises one or more test instruments having a plurality of test channels, and wherein the connection device comprises a plurality of parallel connections from the probe antennas to the one or more test instruments.

15. The system of claim 12, wherein the connection device comprises at least one switch connected to each of the probe antennas and configured to sequentially connect the probe antennas to the at least one test instrument under control of the controller.

16. The system of claim 12, wherein the test instrument includes at least one of a signal source and a spectrum analyzer.

17. A method of testing a multi-input, multi-output (MIMO) device under test (DUT) having an array of antenna elements, the method comprising:
  connecting via a connection device at least one test instrument to a plurality of probe antennas which are disposed within an over-the-air (OTA) test chamber;
  placing the MIMO DUT within the OTA test chamber such that the probe antennas are located in a near field region of the antenna elements;
  measuring at least one calibration parameter for the array of antenna elements of the MIMO DUT using the plurality of probe antennas located in the near field region of the antenna elements and the at least one test instrument;
  measuring at least one radio frequency (RF) channel parameter for each of a plurality of RF channels of the MIMO DUT using the plurality of probe antennas disposed within the OTA test chamber and located in the near field region of the antenna elements and the at least one test instrument;
  measuring a first intensity of a near field radiation pattern produced by the antenna elements within the OTA test chamber at a first point along a central axis orthogonal to the array of the antenna elements;
  measuring additional near field intensities of the near field radiation pattern produced by the antenna elements within the OTA test chamber at a plurality of other points disposed along a first circle defining an expected beamwidth of a main lobe of a far field radiation pattern of the antenna elements, using the at least one test instrument; and
  applying a mapping relationship to the first near field intensity and additional measured near field intensities of the near field radiation pattern to ascertain a beam gain, and a beam width of the main lobe, of the far field radiation pattern of the antenna elements.

18. The method of claim 17, wherein the at least one test instrument comprises one or more test instruments having a plurality of test channels corresponding to a number of the probe antennas of the OTA test chamber, and wherein the connection device comprises a plurality of parallel connections each corresponding to one of the probe antennas.

19. The method of claim 17, wherein the at least one test instrument comprises one or more test instruments having a plurality of test channels, and wherein the connection device comprises a plurality of parallel connections from the probe antennas to the one or more test instruments, and wherein measuring the at least one RF channel parameter for each of the plurality of RF channels of the MIMO DUT comprises measuring the at least one RF channel parameter for each of the plurality of RF channels of the MIMO DUT at a same time as each other.

20. The method of claim 17, wherein the connection device comprises at least one switch connected to each of the probe antennas, and wherein measuring the at least one RF channel parameter for each of the plurality of RF channels of the MIMO DUT comprises controlling the at least one switch to sequentially connect the probe antennas to the at least one test instrument.

* * * * *